United States Patent
Reich et al.

(10) Patent No.: US 7,860,491 B2
(45) Date of Patent: Dec. 28, 2010

(54) SYSTEM AND METHODS FOR ON-DEMAND DOCUMENT PROVISIONING USING AD HOC NETWORKING

(75) Inventors: David E. Reich, Jupiter, FL (US); Fernando G. Concha, Coral Gables, FL (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 11/609,160

(22) Filed: Dec. 11, 2006

(65) Prior Publication Data

US 2008/0141064 A1    Jun. 12, 2008

(51) Int. Cl.
  *H04M 3/00*    (2006.01)
(52) U.S. Cl. .................. 455/418; 455/41.2; 455/41.3; 455/414.1; 455/412.1; 455/421; 455/432.1; 370/338; 370/216; 370/229
(58) Field of Classification Search ............... 455/41.2, 455/41.3, 412.1, 414.1, 418, 421, 432.1; 370/216, 219, 338
See application file for complete search history.

(56) References Cited

U.S. PATENT DOCUMENTS

| | | | |
|---|---|---|---|
| 5,787,470 A | 7/1998 | DeSimone et al. | |
| 5,864,854 A | 1/1999 | Boyle | |
| 6,026,474 A | 2/2000 | Carter | |
| 6,105,028 A | 8/2000 | Sullivan et al. | |
| 6,108,703 A | 8/2000 | Leighton et al. | |
| 6,253,234 B1 | 6/2001 | Hunt et al. | |
| 6,874,017 B1* | 3/2005 | Inoue et al. | 709/217 |
| 7,035,911 B2 | 4/2006 | Lowery et al. | |
| 2004/0132467 A1 | 7/2004 | Hull et al. | |
| 2005/0025451 A1* | 2/2005 | Bertin et al. | 386/46 |
| 2005/0138138 A1* | 6/2005 | Jelinek et al. | 709/217 |
| 2006/0015573 A1* | 1/2006 | Hurst-Hiller et al. | 709/218 |

* cited by examiner

*Primary Examiner*—Stephen M D'Agosta
(74) *Attorney, Agent, or Firm*—Novak, Druce + Quigg

(57) ABSTRACT

A method of providing data content obtained from one or more network-connected nodes to a mobile computing device is provided. The method includes determining whether a previously-established network connection between the mobile computing device and a network-connected node has been interrupted after the mobile computing device receives a first set of data content and an identifier corresponding to a second set of data content from the network-connected node via the previously-established network connection. The method also includes establishing a wireless connection between the mobile computing device and another computing device if the previously-established network connection has been interrupted and the second set of data content is stored by the other computing device. The method further includes conveying the second set of data content to the mobile computing device from the other computing device via the wireless connection if the previously-established network connection has been interrupted and the second set of data content is stored at the other computing device.

16 Claims, 5 Drawing Sheets

SYSTEM AND METHODS FOR ON-DEMAND DOCUMENT PROVISIONING USING AD HOC NETWORKING

CROSS-REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention is related to the field of data communications, and more particularly, to providing a mobile computing device access to data content stored at a data communications network node.

BACKGROUND OF THE INVENTION

Computer users seeking access to information over the Internet or other data communications network typically encountered difficulties getting the desired information unless the user were able to connect the computer to a data communications network using a fixed, wireline connection. More recently, however, a clear trend in information technology has emerged, that of wireless connectivity. Wireless connectivity not only relieves computer users of the need for fixed wireline connections, but has complemented the development of ever-smaller, more sophisticated mobile computing devices. Beginning with the laptop computer and continuing with devices such as the personal digital assistant (PDA) and the smartphone, a user is able to access vast amounts of information over the Internet or other data communications network using sophisticated devices that are small enough be held, carried, or even worn like an article of clothing by the user.

A persistent obstacle, however, is that a mobile computing device user seeking access to a data communications network such as the Internet typically must first find a connection point such as a wired local area network or a WiFi hotspot to wirelessly connect to in order to access the data communications network. Even with the advent of so-called broadband cards—wireless network adapters for laptops, PDAs and cellphones that provide cellular data transmission—a user still needs to locate a connection point to access the data communications network. Without an adequate signaling channel, the user is still not able to gain access to the network.

One approach to the problem is to cache an expanded amount of data content, such as multiple Web pages, while the user is connected to the Internet or other data communications network. The intent of the approach is to allow a user, after the wireless connection is interrupted due to the loss or attenuation of the wireless signal, to still be able to navigate through the cached data content as though the user were connected to the network. However, the typical mobile computing device, especially a hand-held device, has limited data caching capabilities. Because it cannot be known beforehand which of a wide array of data content the user is likely to access next during an on-line session, the usefulness of this approach is correspondingly limited.

Accordingly, there is a need for a mechanism by which the user of a mobile computing device can access data content after a wireless connection to a data communications network has been interrupted. More particularly, there is a need for an effective and efficient mechanism whereby a user who is in the midst of an on-line session can retrieve additional information as though the user were still network connected even though a previously-established wireless connection has been interrupted.

SUMMARY OF THE INVENTION

The present invention is directed to a system and related methods for providing to a mobile computing device data content obtained from one or more (possibly, but not necessarily) network-connected nodes after an initial connection between the computing device and a network-connected node has been interrupted. One aspect of the invention is that of providing a proxy or interceptor that intervenes when a network session is interrupted so as to provide data content to the mobile computing device when a connection to a data communications network "on ramp" is no longer available. Additionally, the invention provides a mechanism that, acting as a kind of proxy server, can request the data from the cache or memory of a computing device so as to provide requested data content to another mobile computing device when the other computing device is unable to access data content via an actual data communications network.

One embodiment of the invention is a system for providing data content obtained from one or more (possibly) network-connected nodes to a computing device after the computing device has lost a connection to the network. The system can include a connection-interrupt module contained within the computing device. The connection-interrupt module can be configured to determine whether a previously-established network connection between the computing device and a network-connected node has been interrupted after the computing device receives a first set of data content and at least one identifier corresponding to a second set of data content from the network-connected node via the previously-established network connection.

Additionally, the system can include a connection-request module also contained with the computing device. The connection-request module can be configured to generate a request for the second set of data content when a user of the computing device selects the at least one identifier after the previously-established network connection has been interrupted.

The system further can include a wireless interface contained with the computing device. The wireless interface can be configured to wirelessly transmit the request for the second set of data content. Additionally, the wireless interface can be configured to receive the second set of data content from the other computing device if the second set of data content is stored by the other computing device.

Another embodiment of the invention is a system for responding to a request for data content, the request being received from a computing device that has received a first set of data content and at least one identifier corresponding to a second set of data content from a network-connected node before a previously-established network connection has been interrupted. The system can include a request-response module configured to respond to a request for the second set of data content by determining whether the second set of data content is stored in the cache or memory of a computing device on which the system resides. If the second set of data content is stored in the cache or memory, the second set of data content can be conveyed wirelessly to the requesting computing device from the device on which the system resides.

Yet another embodiment of the invention is a system that, residing on a single device, includes a subsystem for obtaining data from another device if the system loses a connection to a data communications network after receiving via a previously-established connection to a network-connected node a first set of data content and at least one identifier associated with a second set of data content. The system further includes an additional subsystem for responding to a request from another computing device that has received a first set of data content and at least one identifier corresponding to a second set of data content before a previously-established network connection between the other computing device and a network-connected node has been interrupted.

Still another embodiment of the invention is a method for providing data content obtained from one or more network-connected nodes to a mobile computing device having lost a connection to a data communications network. The method can include determining whether a previously-established network connection between the mobile computing device and a network-connected node has been interrupted after the mobile computing device receives a first set of data content and at least one identifier corresponding to a second set of data, both having been obtained from the network-connected node via the previously-established network connection.

The method can further include establishing a wireless connection between the mobile computing device and another computing device if the previously-established network connection has been interrupted and if a user selects the at least one identifier. Additionally, the method can include conveying the second set of data content to the mobile computing device from the other computing device via the wireless connection if the second set of data content is stored at the other computing device.

Another embodiment of the invention is a method of searching data content stored in the memory or cache of a computing device in response to a wireless request received from a computing device that has experienced an interruption in a previously-established connection with a data communications network after receiving a first set of data content and at least one identifier associated with a second set of data content. The method, according to a particular embodiment, can include searching a plurality of different identifiers corresponding to data content accessed by the computing device within a predetermined period prior to receiving request from the other computing device. Moreover, the request itself can contain the at least one identifier that provides a basis for searching the stored data content.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention is directed to a system and methods for providing data content obtained from one or more network-connected nodes to a mobile computing device after an initial connection to a network node has been interrupted. One aspect of the system is that it can function as a proxy or interceptor that intervenes when a network session is interrupted so as to provide data content to the mobile computing device when a connection to a data communications network has been lost. Alternately, the system can function as proxy server to provide data content to another mobile computing device when the other computing device is unable to access data content via the data communications network.

Figure 1:
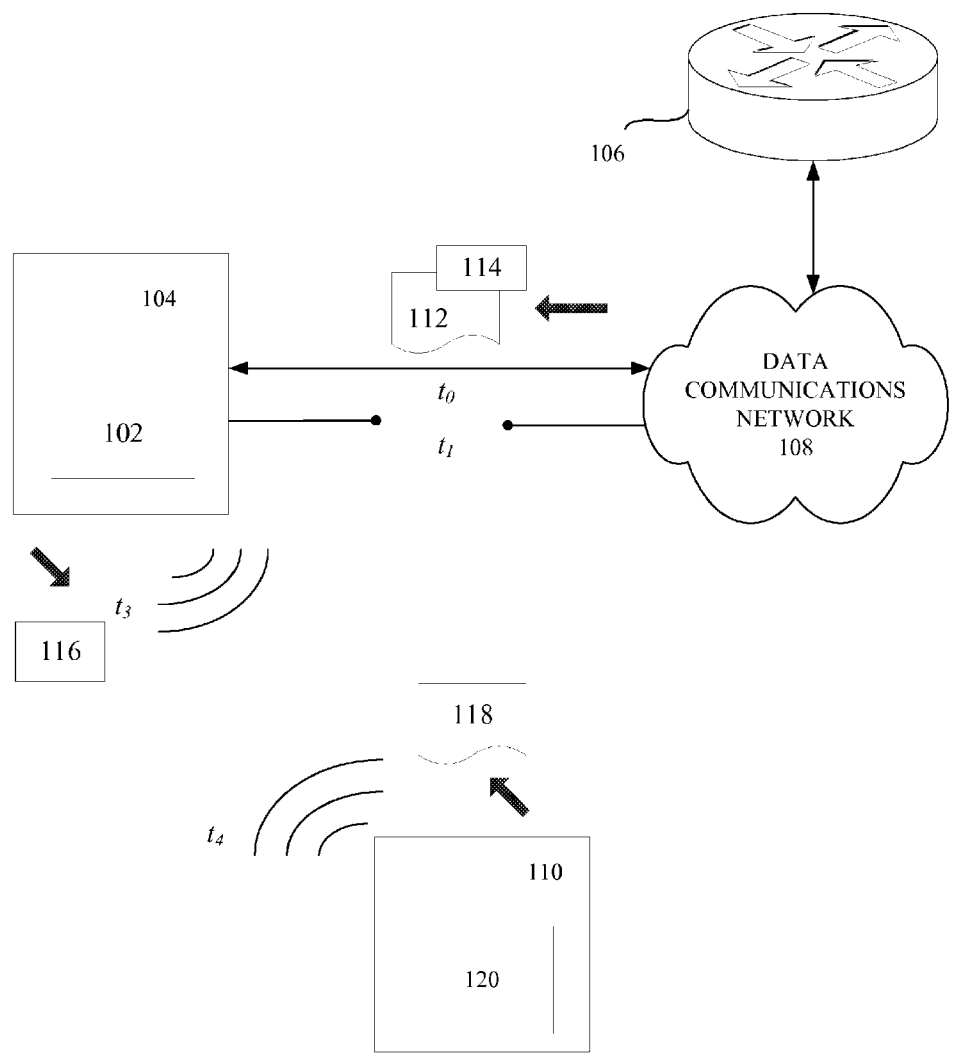
FIG. 1 is a schematic view of an exemplary communications environment in which a system for providing data content to a mobile computing device, according to one embodiment of the invention, is utilized.

FIG. 1 is a schematic view of an exemplary communications environment 100 in which a system 102, according to one embodiment of the invention, is utilized for providing data content to a mobile computing device 104 on which the system resides. The exemplary communications environment 100 illustratively includes at least one network node 106 communicatively linked to a data communications network 108. Additionally, the exemplary communications environment 100 includes at least one other computing device 110, either mobile or fixed, sufficiently near to the mobile computing device 104 as to be able to communicate wirelessly with the mobile computing device.

The mobile communications device 104, for example, can be a laptop computer, a personal digital assistant (PDA), a device combining the functions of a cellular or mobile phone with those of a handheld computer such as a smartphone, or another type of device having the capabilities to effect an exchange of packetized data over a packet-switched network. The exemplary network node 106 can be a network-connected device, such as a server or other application-specific computer, or even a general-purpose computer having the capabilities to exchange data packets over a packet-switched network. The various devices shown can connect to the data communications network 108 through wireline and/or wireless connections. Accordingly, the data communications network 108 can comprise a local area network (LAN), a wide-area network (WAN), a wireless local area network (WLAN), or the Internet.

Initially, at time $t_0$, the mobile computing device 104 is communicatively linked to the network node 106 via a previously-established connection to the data communications network 108. As already noted, the mobile computing device 104 can be connected to the data communications network 108 through a wireline connection or, alternatively, through a wireless channel, such as by connecting to the network through a wireless access point or WiFi "hotspot." Although, the mobile computing device 104 is shown as being communicatively linked to the network-connected node 106 through the data communications network 108, which can comprise one or more intermediate nodes, it will be readily apparent that the computing device 104 alternatively can communicate directly through a wireline or wireless connection with the network-connected node. The system 102, as described herein, can function equally effectively and efficiently regardless of the whether the mobile computing device 104 connects directly to the network-connected node 106 or through the data communications network 108.

Illustratively, the mobile computing device 104 obtains a first set of data content 112 from the network-connected node 106 via the previously-established connection existing at time $t_0$. At time $t_1$ ($t_1 > t_0$), however, the previously-established connection is interrupted. This can be a result of different types of events occurring. For example, the mobile computing device 104 can be a laptop computer initially communicating to the network-connected node 106 through a wireline connection to the data communications network 108. The previously-established connection can be interrupted when the user of the laptop computer disconnects and moves to a new location with the laptop computer. Another example of an event giving rise to a network connection interruption is a user's communicating with a network-connected node using as the mobile computing device 104 a smartphone. The previously-established wireless connection between the user's smartphone and the network node can be interrupted when, for example, the user moves to a new location where wireless signals are obstructed or a location that is out of range of the wireless connection to the data communications network 108. Regardless of the nature of the event resulting in an interruption of the previously-established connection, the system 102 residing on the mobile computing device 104 becomes operative when the connection is lost and handles the interruption as described herein.

The first set of data content 112 received by the mobile computing device 104 from the network-connected node 106 can include at least one identifier 114 associated with a second set of data content that is also stored at the network-connected node. For example, if the network-connected node 106 is a Web server and the first set of data content 112 is a Web page, the at least one identifier 114 can be a link associated with one or more other Web pages (i.e., the second set of data content). Because the at least one identifier can be stored in a memory (not shown) of the mobile computing device 104, a user would be able to access the second set of data content by selecting the at least one identifier 114 were the device still communicatively linked to the network-connected node 106. However, when the previously-established connection is interrupted, the user is unable to access the second set of data content even though the at least one identifier 114 associated with the second set of data content remains stored at the mobile computing device 104. At this point, the system 102 functioning as a proxy or interceptor intervenes to provide data content to the mobile computing device 104 as though the device were still connected to the node 106 via the data communications network 108.

Figure 2:
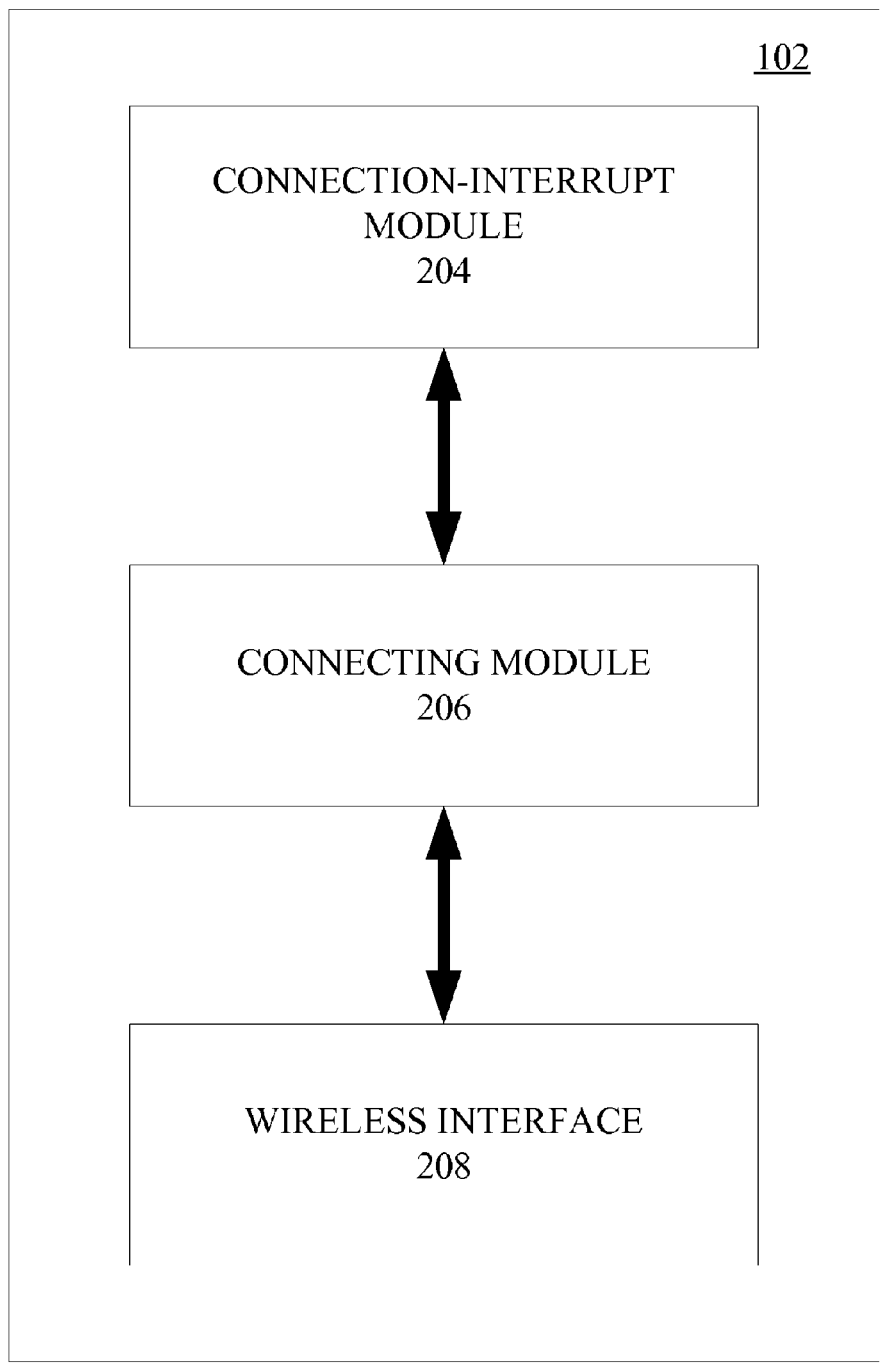
FIG. 2 is an enhanced schematic view of the system illustrated in FIG. 1.

Referring additionally now to FIG. 2, the system 102, according to one embodiment, includes a connection-interrupt module 204, a connection-request module 206, and a wireless interface 208 that are each communicatively linked to one another and that function cooperatively in providing the second set of data content associated with the at least one identifier 114 after the previously-established connection is interrupted. The connection-interrupt module 204, connection-request module 206, and wireless interface 208 can be implemented as software code that is stored in a memory (not shown) and configured to execute on a processor or microprocessor (also not shown) of the mobile computing device 104. Alternatively, one or more of the connection-interrupt module 204, connection-request module 206, and wireless interface 208 can be implemented in dedicated hardwired circuitry configured to connect with other circuitry contained within the mobile computing device 104. According to still another embodiment, one or more of the connection-interrupt module 204, connection-request module 206, and wireless interface 208 can be implemented in a combination of software code and hardwired circuitry.

Accordingly, in one embodiment, the system 102 can be implemented as a plugin or other extension of an existing browser configured to execute on the mobile computing device 104, the extension operating through an application programming interface (API). In an alternate embodiment, the system 102 can be software code incorporated into the browser.

Operatively, the connection-interrupt module 204 determines whether a previously-established network connection between the mobile computing device and a network-connected node 106 has been interrupted. According to a particular embodiment, the connection-interrupt module 204 monitors or observes the previously-established network connection and begins a count or timer when, or soon after, the connection is lost. If the duration that the previously-established network connection has been interrupted exceeds a predetermined threshold, then the connection-interrupt module 204 determines that the connection has been irreparably interrupted and signals the connection-request module 206 to invoke the functions performed by the latter module.

The connection-interrupt module 204 can observe the connection continuously or intermittently once the connection is initially established. If the connection-interrupt module 204 observes the connection intermittently, then the connection can be observed at regular or periodic intervals. Alternatively, the connection-interrupt module 204 can observe the connection randomly at varying time intervals. According to still another embodiment, when the network-connected node 106 is a server, the connection-interrupt module 204 can monitor the state of the connection, the state being either a server-available state or a server-not-available state. If the connection-interrupt module 204 observes that the server cannot be accessed, then, again, the module can generate a signal that invokes the functions performed by the connection-request module 206.

The connection-request module 206, when invoked, generates a message 116 requesting the second set of data content. The connection-request module 206 is invoked if the previously-established network connection has been interrupted and if a user of the mobile computing device 104 selects the at least one identifier, such as through a point-and-click operation performed on the identifier as it is displayed on a graphic interface (not shown) of the mobile computing device.

According to a particular embodiment, the message 116 or request generated by the connection-request module 206 is transmitted by the wireless interface 208 at time $t_2$ ($t_2 > t_1 > t_0$), the message requesting a connection with another computing device. If another computing device 110, which itself can be a mobile device or, alternatively, a fixed device having wireless communication capabilities, is within a sufficient range to communicate wirelessly with the mobile computing device 104, the message is received by the other computing device. The wireless interface 208 can be configured to transmit and receive various types of electromagnetic signals for effecting wireless communications. For example, the electromagnetic signals utilized can comprise radio signal, microwave signals, or infrared signals. Accordingly, the wireless interface can be implemented using wireless fidelity (WiFi) technology, short-range radio signals according to the Bluetooth specification, infrared signaling, or other networking technologies for wirelessly linking the mobile computing device 104 and at least one other device.

The message 116 or request can include the at least one identifier 114. Accordingly, when the message 116 is received by the other computing device 110, the other computing device can determine whether it has stored in its memory or cache 120 a copy of the second set of data content 118 associated with the at least one identifier 114. For example, if the connection-request module 206 is requesting a Web page or document, the message 116 can comprise an HTTP request which is broadcasted over all active network ports and, moreover, can include a reserved IP address.

In an alternate embodiment, however, the connection-request module 206 can delay conveying the at least one identifier 114 via the wireless interface 208 until a response from the other computing device 110 has been received. In any event, the other computing device 110 need not respond at all to wireless signals transmitted by the mobile computing device 104 unless the device receives an identifier associated with data content sought by the mobile computing device and, based upon the identifier, determines that a copy of the data content is stored in the device's memory or cache.

If the second set of data content 118 is available from the other computing device 110, the wireless interface 208 receives wireless signals encoded with the second set of data content. The wireless interface 208 decodes the signals so that other processing modules (not shown) can present the data content to the user via a user interface (also not shown.) Accordingly, if the previously-established network connection has been interrupted and if the user selects the at least one identifier 114 identifying data content that the other computing device 110 can supply the requested second set of data content 118 via the wireless interface 208. Optionally, the connection-request module 206 can be further configured to generate a content-not-available message if a response to the message 116 or request for the second set of data content transmitted at time $t_2$ is not received within a predetermined period of time.

Figure 3:
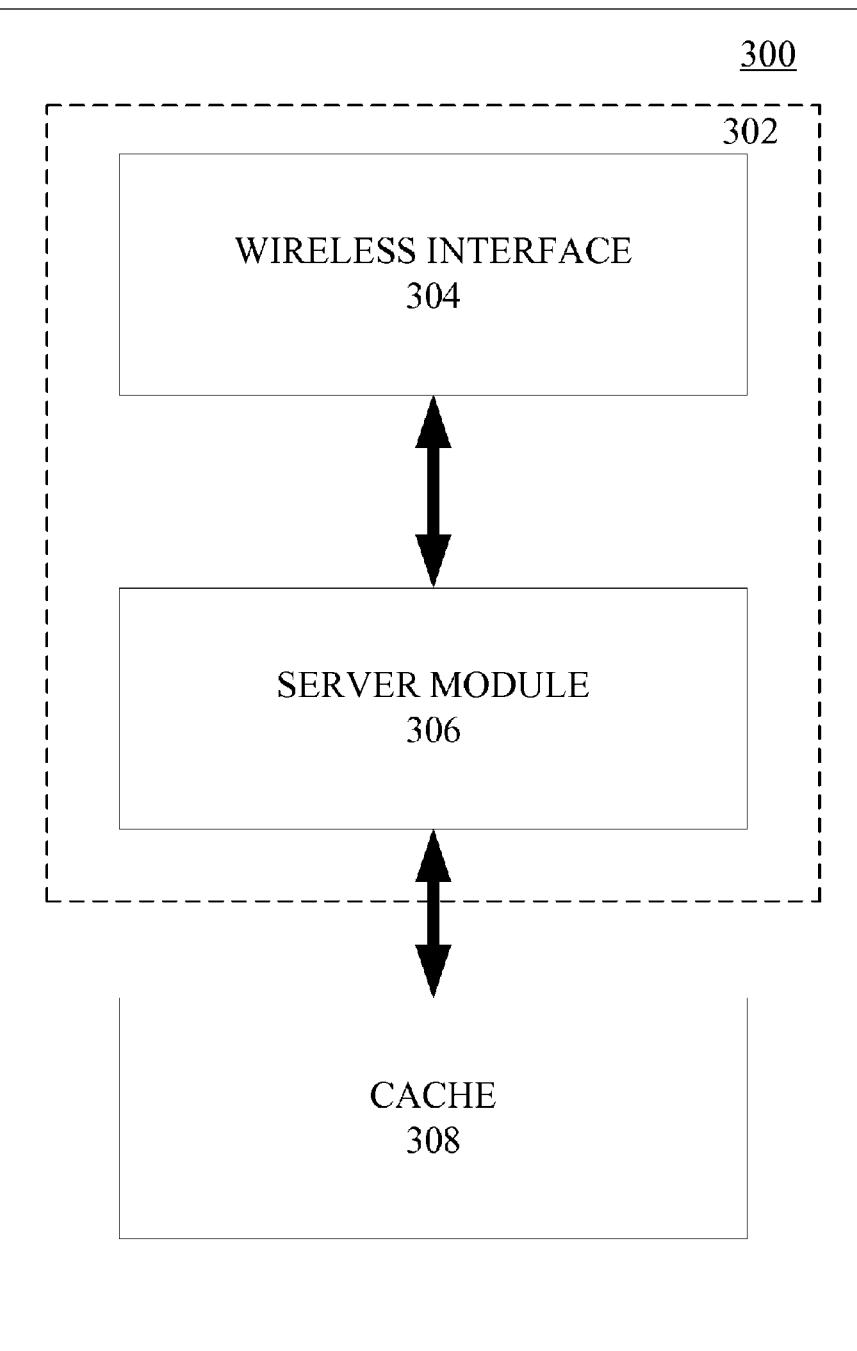
FIG. 3 is a schematic view of a system for providing data content to a mobile computing device, according to another embodiment of the invention.

FIG. 3 is schematic view of a computing device 300 within which a system 302 that, according to another embodiment of the invention, effects the wireless transfer of data content stored in a cache or memory of the device in response to a wireless request from another computing device. One aspect of the system 302 is that it transforms the computing device 300 into a proxy server that can provide data content to another computing device when the other computing device can not connect to a data communications network. In the aggregate, the system-enabled computing device 300 and other devices for which it acts as a server can create an ad hoc network that substitutes for an actual data communications network.

The system 302 illustratively includes a wireless interface 304 through which a request for data content, wirelessly transmitted by another computing device, is received. Additionally, the system 302 illustratively includes a request-response module 306 that is invoked when such a request is received. In response to the request, the request-response module 306 identifies the particular data content requested, based upon a content identifier received from the other computing device. The request-response module 306 searches a cache 308 or other memory residing with the system 302 on the computing device 300 to determine whether the requested data content is contained therein.

According to a particular embodiment, the received request is an HTTP request that can be broadcasted over each active network port of a requesting computing device. The request-response module 306 can thus be configured to observe all active network ports for HTTP requests. Indeed, the server module 306 can function in the manner of a conventional server, providing a proxy or substitute server when the other computing device has experienced an interruption in a connection to a network-connected server. If an HTTP request is observed, therefore, the server module 306 can determine the data content that is being requested by examining a domain name contained in the request.

Additionally, the request-response module 306 can be configured to search for requested data content by examining a plurality of different identifiers corresponding to different data content accessed by the computing device 300 within a predetermined period prior to the computing device receiving from the other computing device the request containing the at least one identifier. Thus, when the received request is an HTTP request, the request-response module 306 knows what data content has been recently viewed by a user of the computing device 300 and thus can efficiently determine what data content is currently stored in the cache 308 of the device. If the recently-viewed data content corresponds to a domain name in the HTTP request, then the request-response module 306 can determine whether a particular page from the identified domain is stored in the cache 308. If so, then the request-response module 306 can respond to the request by transmitting the page via the wireless interface 304 to the other computing device requesting the content.

Figure 4:
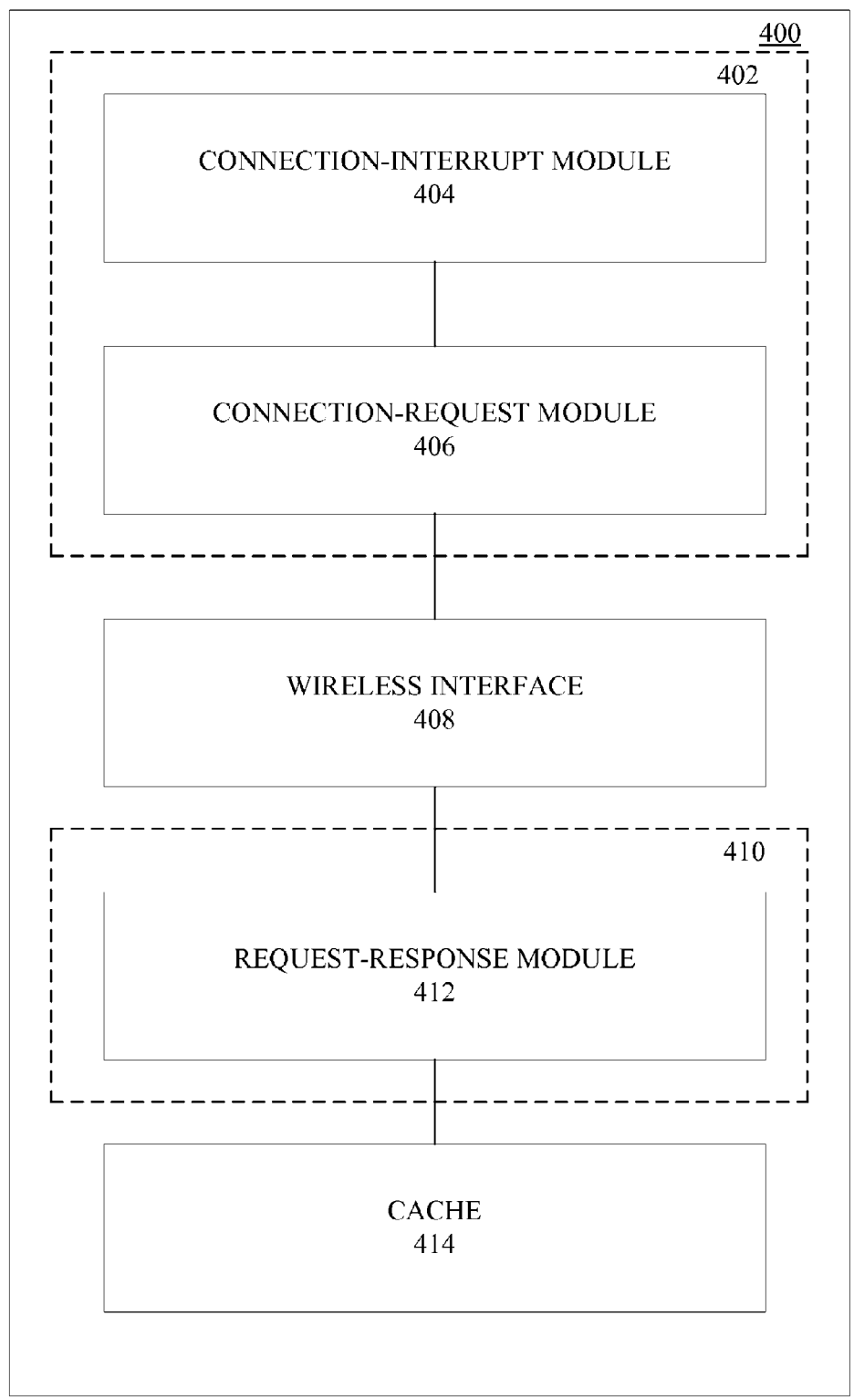
FIG. 4 is a schematic view of a system for providing data content to a mobile computing device, according to still another embodiment of the invention

As described, the system for responding at one computing device to a request from another computing device is distinct from the system for requesting data content after a connection to a data communications network has been interrupted. According to another embodiment of the invention, however, these distinct systems can be combined into a single system residing on a single computing device. Such a system is schematically illustrated in FIG. 4. The system 400 illustratively comprises two distinct subsystems that function in alternate situations.

One of the subsystems is a requesting subsystem 402 that operates to obtain data from another computing device when the device on which the system 400 resides has lost a connection to a data communications network after having received a first set of data content and at least one identifier associated with a second set of data content. The requesting subsystem 402 illustratively includes a connection-interrupt module 404. The connection-interrupt module 402 operates to determine whether a previously-established network connection between the device on which system 400 resides and a network-connected node has been interrupted after the device receives the first set of data content and at least one identifier corresponding to the second set of data content from the network-connected node.

The requesting subsystem 402 further includes a connection-request module 406. The connection request module 406 operates to generate a request for the second set of data content when a user of the computing device selects the at least one identifier and the previously-established network connection has been interrupted. The message is transmitted via a wireless interface 408 that is part of the device on which the system 400 resides. If the second set of data content is available at another computing device within the vicinity, then the second set of data content can be received at the wireless interface 408 as a encoded wireless signals transmitted by the other computing device.

The other subsystem is a responding subsystem 410 for responding to a request for data content received from another computing device that has experienced an interruption to a previously-established connection to a data communications network. The responding system 410 illustratively comprises a request-response module 412 that determines whether a requested set of data content is stored at the computing device in response to a request conveyed in a wireless signal from the other computing device. The request-response module 412 determines whether a requested set of data content is stored at the computing device by searching a cache 414 or other memory of the device on which the system 400 resides.

As already described, the request-response module 412 can be configured to determine whether a requested set of data content is stored at the computing device by searching a plurality of different identifiers, each corresponding to different data content accessed by the other computing device within a predetermined period prior to the computing device receiving from the other computing device the request containing the at least one identifier. The responding subsystem 410 can utilize the same wireless interface 408 utilized by the requesting subsystem 402 to receive a request for data content and to respond to the request if it is determined that the data content is stored in the cache 414 or memory of the device.

Figure 5:
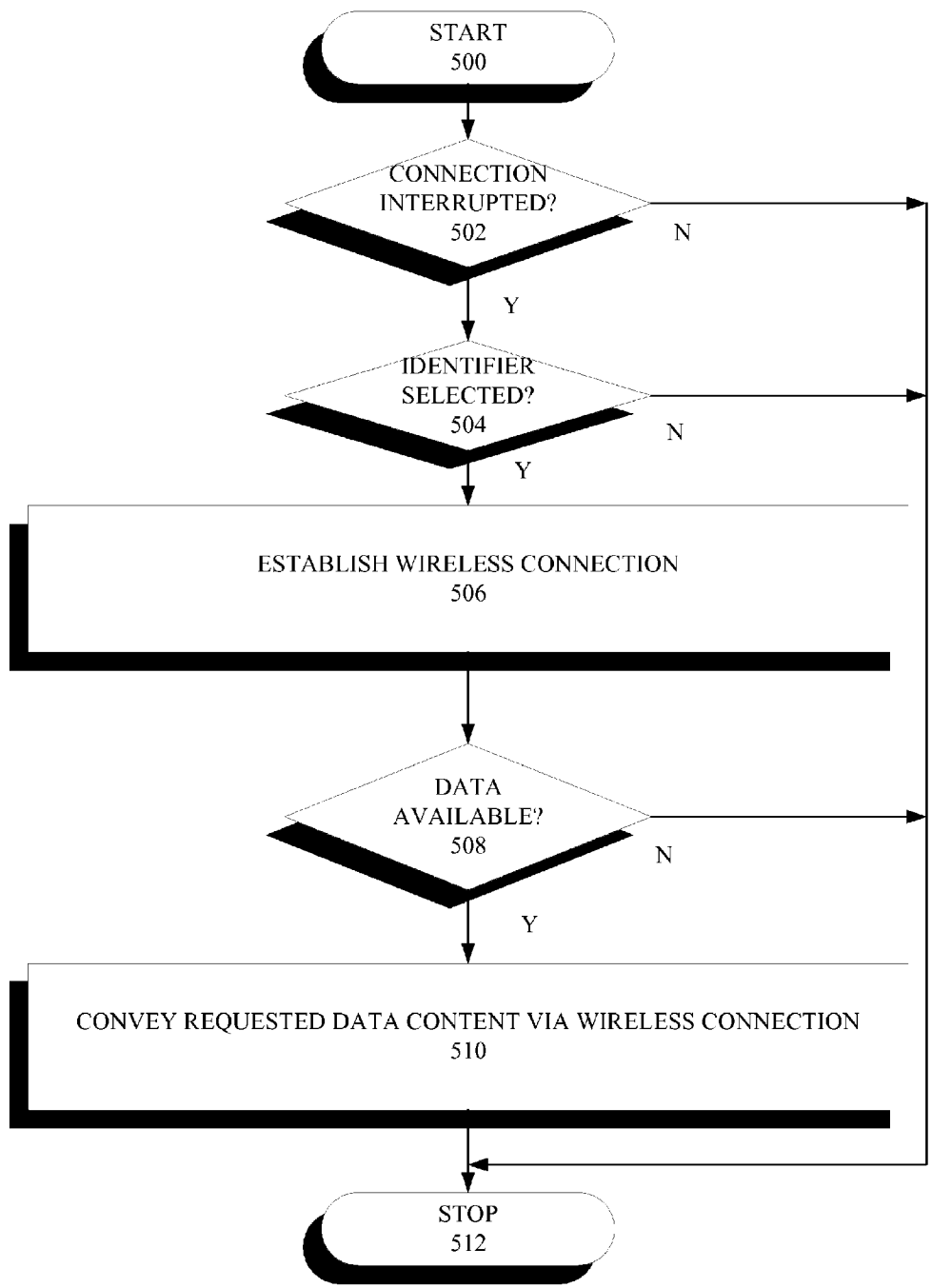
FIG. 5 is a flowchart of exemplary steps in a method for providing data content to a mobile computing device, according to yet another embodiment of the invention.

FIG. 5 is a flowchart of exemplary steps of a method 500 for providing data content obtained from one or more network-connected nodes to a mobile computing device, according to another embodiment of the invention. The method illustratively includes determining at decision block 502 whether a previously-established network connection between the mobile computing device and a network-connected node has been interrupted. The determination is made after the mobile computing device receives a first set of data content and at least one identifier corresponding to a second set of data content from the network-connected node via the previously-established network connection. When the previously established network connection has been interrupted, if a user selects the at least one identifier at decision block 504, then a wireless connection between the mobile computing device and another computing device can be established at step 506.

At block decision block 508, a determination is made as to whether the second set of data content is stored at the other computing device. If so, then at step 510 the second set of data content is conveyed to the mobile computing device from the other computing device via the wireless connection. The method illustratively concludes at step 512.

The determination at decision block 502 as to whether or not the previously-established network connection has been interrupted, according to one embodiment, can be effected by determining that a duration in which the previously-established network connection has been interrupted exceeds a predetermined threshold. The predetermined threshold, optionally, can be a variable threshold.

According to another embodiment, the step 506 of establishing the wireless connection can include wirelessly broadcasting a request from the mobile computing device initially requesting that a connection be established between the computing device and another computing device within the vicinity. The request, optionally, can contain the at least one identifier. Alternatively, the request can be conveyed as a separate wireless message after receiving an acknowledgment from another computing device.

According to still another embodiment, the step of establishing the wireless connection can comprise broadcasting via wireless signals a request for such peer interaction. Additionally, or alternatively, the step of establishing a wireless connection can comprises broadcasting at each active network port an HTTP request. Optionally, the method 500 can further include generating a content-not-available message at the mobile computing device if a response to the request is not received within a predetermined period of time.

Another method aspect of the invention is that of searching data content stored in the memory or cache of a computing device in response to a wireless request received from a computing device that has experienced an interruption in a previously-established connection with a data communications network after receiving a first set of data content and at least one identifier associated with a second set of data content. The method, according to a particular embodiment, can include searching a plurality of different identifiers corresponding to data content accessed by the computing device within a predetermined period prior to receiving request from the other computing device. Moreover, the request itself can contain the at least one identifier that provides a basis for searching the stored data content.

As described above, the invention can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method of providing data content obtained from a network-connected node to a mobile user computing device after a previously-established network connection between the mobile user computing device and the network-connected node has been interrupted, the method comprising:

determining whether the previously-established network connection between the mobile user computing device and the network-connected node has been interrupted after the mobile user computing device receives a first set of data content and at least one identifier corresponding to a second set of data content from the network-connected node via the previously-established network connection;

establishing a wireless connection between the mobile user computing device and another peer user computing device if the previously-established network connection has been interrupted and if a user of the mobile user computing device selects the at least one identifier;

determining whether the second set of data content is included among stored data content stored at the other peer user computing device by searching a plurality of different identifiers corresponding to data content accessed by the other peer user computing device within a predetermined period prior to the other peer user computing device receiving from the mobile user computing device a request containing the at least one identifier; and conveying the second set of data content to the mobile user computing device from the other peer user computing device via the wireless connection if the previously-established network connection has been interrupted and if the second set of data content is stored at the other peer user computing device.

2. The method of claim 1, wherein the step of determining that the previously-established network connection has been interrupted comprises determining that a duration that the previously-established network connection has been interrupted exceeds a predetermined threshold.

3. The method of claim 1, wherein the step of establishing the wireless connection comprises wirelessly broadcasting a request from the mobile user computing device.

4. The method of claim 3, wherein the request contains the at least one identifier.

5. The method of claim 3, further comprising generating a content-not-available message at the mobile user computing device if a response to the request is not received within a predetermined period of time.

6. The method of claim 1, wherein the step of establishing the wireless connection comprises wirelessly broadcasting an HTTP request broadcast over each active network port.

7. The method of claim 1, wherein the step of establishing the wireless connection comprises wirelessly broadcasting a request that includes a reserved IP address.

8. The method of claim 1, further comprising searching data content stored at the other peer user computing device to determine whether the second set of data content corresponding to the at least one identifier is included among data content stored by the other peer user computing device.

9. A system for providing data content obtained from a network-connected node to a mobile user computing device after a previously-established network connection between the mobile user computing device and the network-connected node has been interrupted, the system comprising:

a connection-interrupt module contained within the mobile user computing device and configured to determine whether the previously-established network connection between the mobile user computing device and the network-connected node has been interrupted after the mobile user computing device receives a first set of data content and at least one identifier corresponding to a second set of data content from the network-connected node via the previously-established network connection;

a connection-request module contained within the mobile user computing device and configured to generate a request for the second set of data content when a user of the mobile user computing device selects the at least one identifier and the previously-established network connection has been interrupted;

a wireless interface contained within the mobile user computing device and configured to (1) wirelessly transmit the request for the second set of data content, and (2) receive the second set of data content from another peer user computing device via a wireless connection established between the mobile user computing device and the other peer user computing device if the second set of data content is stored by the other peer user computing device; and a request-response module configured to determine whether a requested set of data content is stored at the mobile user computing device in response to a request conveyed in a wireless signal from another peer user computing device, wherein the request-response module is configured to determine whether a requested set of data content is stored at the mobile user computing device by searching a plurality of different identifiers corresponding to data content accessed by the other peer user computing device within a predetermined period prior to the mobile user computing device receiving from the other peer user computing device the request containing the at least one identifier.

10. The system of claim 9, wherein the connection-interrupt module is configured to determine whether the previously-established network connection has been interrupted by detecting a no-access-to-server message generated by a browser executing on the mobile user computing device.

11. The system of claim 9, wherein the request comprises an HTTP request for broadcasting over each active network port of the mobile user computing device.

12. The system of claim 9, wherein the request comprises a reserved IP address.

13. A computer-readable storage medium, the storage medium comprising computer instructions embedded therein for:

determining whether a previously-established network connection between a mobile user computing device and a network-connected node has been interrupted after the mobile user computing device receives a first set of data content and at least one identifier corresponding to a second set of data content from the network-connected node via the previously-established network connection;

establishing a wireless connection between the mobile user computing device and another peer user computing device if the previously-established network connection has been interrupted and if a user of the mobile user computing device selects the at least one identifier;

determining whether the second set of data content is included among stored data content stored at the other peer user computing device by searching a plurality of different identifiers corresponding to data content accessed by the other peer user computing device within a predetermined period prior to the other peer user computing device receiving from the mobile user computing device a request containing the at least one identifier; and conveying the second set of data content to the mobile user computing device from the other peer user computing device via the wireless connection if the previously-established network connection has been interrupted and if the second set of data content is stored at the other peer user computing device.

14. The computer-readable storage medium of claim 13, further comprising computer instructions for causing the mobile user computing device to wirelessly transmit a request containing the at least one identifier.

15. The computer-readable storage medium of claim 14, wherein the request comprises an HTTP request, and wherein the storage medium further comprises computer code for causing the computing device to broadcast the HTTP request over each active port of the mobile user computing device.

16. The computer-readable storage medium of claim 14, wherein the request further comprises a reserved IP address.

* * * * *